US012200717B2

United States Patent
Xue et al.

(10) Patent No.: US 12,200,717 B2
(45) Date of Patent: Jan. 14, 2025

(54) WIRELESS COMMUNICATION METHOD, TERMINAL DEVICE, AND NETWORK DEVICE IMPLEMENTING DYNAMIC CROSS-SLOT SCHEDULING

(71) Applicant: Huawei Technologies Co., Ltd., Shenzhen (CN)

(72) Inventors: Lixia Xue, Beijing (CN); Zheng Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 546 days.

(21) Appl. No.: 17/487,839

(22) Filed: Sep. 28, 2021

(65) Prior Publication Data

US 2022/0022174 A1    Jan. 20, 2022

Related U.S. Application Data

(63) Continuation of application No. PCT/CN2020/081410, filed on Mar. 26, 2020.

(30) Foreign Application Priority Data

Mar. 29, 2019    (CN) .......................... 201910252640.4

(51) Int. Cl.
*H04W 72/23*    (2023.01)
*H04W 72/0446*    (2023.01)

(52) U.S. Cl.
CPC ....... *H04W 72/23* (2023.01); *H04W 72/0446* (2013.01)

(58) Field of Classification Search
CPC .......................... H04W 72/23; H04W 72/0446
See application file for complete search history.

(56) References Cited

U.S. PATENT DOCUMENTS

| | | | |
|---|---|---|---|
| 2018/0332655 A1 | 11/2018 | Ang et al. | |
| 2019/0090299 A1 | 3/2019 | Ang et al. | |
| 2020/0107345 A1* | 4/2020 | Ang | H04L 1/0026 |

FOREIGN PATENT DOCUMENTS

| | | |
|---|---|---|
| CN | 109392159 A | 2/2019 |
| WO | 2018210195 A1 | 11/2018 |

OTHER PUBLICATIONS

"3rd Generation Partnership Project; Technical Specification Group Radio Access Network; NR; Study on UE Power Saving (Release 16)," 3GPP TR 38.840 V1.0.0, pp. 1-69, XP051690577, 3rd Generation Partnership Project, Valbonne, France (Mar. 2019).

(Continued)

*Primary Examiner* — Natasha W Cosme
(74) *Attorney, Agent, or Firm* — Leydig, Voit & Mayer, Ltd.

(57) ABSTRACT

This application provides a wireless communication method, a terminal device, and a network device. The wireless communication method includes: A terminal device selects, based on a first parameter, a value set from a first value set and a second value set that are of slot offsets and that are configured by a network device, wherein all slot offsets in the first value set are greater than a first threshold, and at least one slot offset in the second value set is equal to the first threshold; and receive DCI, wherein a slot offset carried in the DCI belongs to the selected value set, and the slot offset is used to indicate an offset in a quantity of slots of a PDSCH scheduled by the DCI relative to the DCI. According to the technical solutions in this application, the different value sets correspond to different data channel scheduling mechanisms.

6 Claims, 16 Drawing Sheets

(56) References Cited

OTHER PUBLICATIONS

"UE Power Saving Techniques," 3GPP TSG-RAN WG1 Meeting #96, R1-1902771, Athens, Greece, XP051600466, Total 15 pages, 3rd Generation Partnership Project, Valbonne, France (Feb. 25-Mar. 1, 2019).

Qualcomm Incorporated, "UE Adaptation to the Traffic and UE Power Consumption Characteristics," 3GPP TSG-RAN WG1 Meeting #95, Spokane, Washington, USA, R1-1813447, total 20 pages, 3rd Generation Partnership Project, Valbonne, France (Nov. 12-16, 2018).

Qualcomm Incorporated, "UE Adaptation to the Traffic and UE Power Consumption Characteristics," 3GPP TSG-RAN WG1 Meeting #94bis, Chengdu, China, R1-1811282, total 17 pages, 3rd Generation Partnership Project, Valbonne, France (Oct. 8-12, 2018).

* cited by examiner

WIRELESS COMMUNICATION METHOD, TERMINAL DEVICE, AND NETWORK DEVICE IMPLEMENTING DYNAMIC CROSS-SLOT SCHEDULING

CROSS-REFERENCE TO RELATED APPLICATIONS

This application is a continuation of International Application No. PCT/CN2020/081410, filed on Mar. 26, 2020, which claims priority to Chinese Patent Application No. 201910252640.4, filed on Mar. 29, 2019. The disclosures of the aforementioned applications are hereby incorporated by reference in their entireties.

TECHNICAL FIELD

This application relates to the wireless communication field, and more specifically, to a wireless communication method, a terminal device, and a network device.

BACKGROUND

In fifth generation access system standard new radio (NR), both same-slot scheduling and cross-slot scheduling of a physical downlink shared channel (PDSCH) are supported. For the same-slot scheduling, a scheduled PDSCH and a physical downlink control channel (PDCCH) that schedules the PDSCH are located in a same slot. For the cross-slot scheduling, the scheduled PDSCH and the PDCCH that schedules the PDSCH are located in different slots.

Compared with the same-slot scheduling, the cross-slot scheduling allows user equipment (user equipment, terminal device) to use some power saving methods to reduce power consumption of the terminal device. FIG. 3 shows power consumption of a terminal device in same-slot scheduling, and FIG. 4 shows power consumption of a terminal device in cross-slot scheduling. For the same-slot scheduling in FIG. 3, the terminal device cannot learn of whether data is scheduled within PDCCH decoding time, that is, before downlink control information (DCI) is obtained through decoding. Therefore, downlink data received in this period of time needs to be buffered, and a front-end module such as a radio frequency module needs to be enabled. The terminal device enters a sleep state after this period of time if there is no PDSCH transmission in the slot, and therefore the terminal device consumes more power. However, for the cross-slot scheduling in FIG. 4, a power saving method is as follows: If the terminal device learns, at least one slot in advance, that there is no scheduling in a current slot, the terminal device may disable a front-end module such as a downlink data radio frequency module and disable buffering of received downlink data within PDCCH decoding time, to enter a sleep state in advance to save power of the terminal device.

Generally, a packet-based data stream is usually bursty. There is data transmission in a time period, but there is no data transmission in a subsequent relatively long time period. In this case, cross-slot scheduling may be used to reduce power consumption of the terminal device and prolong battery lifespan. However, in another case in which there is a relatively high requirement on a latency and a throughput, for example, when a base station may need to schedule data on consecutive slots for a terminal device, same-slot scheduling may be used to reduce a latency for data scheduling.

Therefore, how to implement, based on a requirement on data transmission, a power saving mechanism through dynamic cross-slot scheduling, to adapt to a change in data traffic, reduce impact on a latency and a throughput, and improve a power saving effect becomes an urgent problem to be resolved.

SUMMARY

This application provides a wireless communication method, a terminal device, and a network device, to resolve a problem that a scheduling mechanism cannot be dynamically changed between a cross-slot scheduling mechanism and a same-slot scheduling mechanism based on a requirement on data transmission.

According to a first aspect, a wireless communication method is provided. The method includes: A terminal device selects, based on a first parameter, a value set from a first value set and a second value set that are of slot offsets and that are configured by a network device, where all slot offsets in the first value set are greater than a first threshold, at least one slot offset in the second value set is equal to the first threshold, and the slot offset is used to indicate an offset in a quantity of slots of a downlink control information DCI-scheduled physical downlink shared channel (PDSCH) relative to the DCI. The terminal device receives DCI sent by the network device, where a slot offset carried in the DCI belongs to the determined value set.

According to the wireless communication method in this embodiment of this application, the terminal device selects, based on a current first parameter, a value set of slot offsets corresponding to the first parameter, where different value sets correspond to different scheduling mechanisms. In this way, the terminal device can adapt to a change in data traffic, reduce impact on a latency and a throughput, and reduce power consumption.

With reference to the first aspect, in some implementations of the first aspect, the first parameter includes at least one of the following: a quantity of receive antennas currently used by the terminal device, a periodicity at which the terminal device detects a search space set, a type of a timer run by the terminal device, and first information carried in a previous piece of DCI received by the terminal device.

According to the wireless communication method in this embodiment of this application, the terminal device selects a value set of slot offsets based on a value of an operating parameter, where different value sets correspond to different scheduling manners. In this way, the terminal device flexibly selects a scheduling mechanism based on the operating parameter used to meet requirements such as power saving or latency reduction.

With reference to the first aspect, in some implementations of the first aspect, the first parameter is the quantity of receive antennas currently used by the terminal device, and that a terminal device selects, based on a first parameter, a value set from a first value set and a second value set that are of slot offsets and that are configured by a network device includes: The terminal device selects the first value set when the quantity of receive antennas currently used by the terminal device is a first quantity of antennas; and the terminal device selects the second value set when the quantity of receive antennas currently used by the terminal device is a second quantity of antennas, where the first quantity of antennas is less than the second quantity of antennas.

According to the wireless communication method in this embodiment of this application, when the used quantities of receive antennas are different, the terminal device selects a value set of slot offsets corresponding to a currently used quantity of antennas, so that the terminal device can select a corresponding scheduling mechanism based on a requirement, to adapt to a change in data traffic, reduce impact on a latency and a throughput, and reduce power consumption.

With reference to the first aspect, in some implementations of the first aspect, the first parameter is the periodicity at which the terminal device detects the search space set, and that a terminal device selects, based on a first parameter, a value set from a first value set and a second value set that are of slot offsets and that are configured by a network device includes: The terminal device selects the first value set when the periodicity at which the terminal device detects the search space set is a first detection periodicity; and the terminal device selects the second value set when the periodicity at which the terminal device detects the search space set is a second detection periodicity, where the first detection periodicity is greater than the second detection periodicity.

According to the wireless communication method in this embodiment of this application, when the periodicities at which the terminal device detects the search space set are different, the terminal device selects a value set of slot offsets corresponding to a current periodicity, so that the terminal device can select a corresponding scheduling mechanism based on a requirement, to adapt to a change in data traffic, reduce impact on a latency and a throughput, and reduce power consumption.

With reference to the first aspect, in some implementations of the first aspect, when the terminal device is within discontinuous reception (DRX) active time, the first parameter is the type of the timer run by the terminal device; and that a terminal device selects, based on a first parameter, a value set from a first value set and a second value set that are of slot offsets and that are configured by a network device includes: The terminal device selects the first value set when the terminal device runs only an on duration timer; the terminal device selects the second value set when the terminal device runs a same-slot scheduling timer, where the same-slot scheduling timer is started or restarted when the terminal device detects a physical downlink control channel PDCCH; and the terminal device selects the first value set when the same-slot scheduling timer expires.

According to the wireless communication method in this embodiment of this application, when the types of the timer used by the terminal device are different, a value set of slot offsets corresponding to the type of the timer is selected, so that the terminal device can select a corresponding scheduling mechanism based on a requirement, to adapt to a change in data traffic, reduce impact on a latency and a throughput, and reduce power consumption.

With reference to the first aspect, in some implementations of the first aspect, the first parameter is the first information carried in the previous piece of DCI received by the terminal device, and the first information is used to indicate the first value set or the second value set; and that a terminal device selects, based on a first parameter, a value set from a first value set and a second value set that are of slot offsets and that are configured by a network device includes: The terminal device selects the first value set when the first information is used to indicate the first value set; and the terminal device selects the second value set when the first information is used to indicate the second value set.

According to the wireless communication method in this embodiment of this application, the terminal device can determine, based on an indication value in the DCI, a value set of slot offsets used for PDSCH scheduling, to quickly adapt to a change in data traffic, reduce a latency of a data channel, and improve a power saving effect.

With reference to the first aspect, in some implementations of the first aspect, the first information occupies at least one bit in a time domain resource assignment information field of the DCI.

With reference to the first aspect, in some implementations of the first aspect, the slot offset in the first value set is a slot offset in a first allocation table, and the slot offset in the second value set is a slot offset in a second allocation table; or both the slot offset in the first value set and the slot offset in the second value set are slot offsets in a third allocation table.

With reference to the first aspect, in some implementations of the first aspect, when the determined value set is the first value set, a scheduling manner of the PDSCH is cross-slot scheduling; and/or when the determined value set is the second value set, a scheduling manner of the PDSCH is same-slot scheduling or cross-slot scheduling.

According to the wireless communication method in this embodiment of this application, the terminal device determines the scheduling manner of the PDSCH by determining different value sets of slot offsets.

It should be understood that, during the cross-slot scheduling, the terminal device may learn, at least one slot in advance, that a slot in which the current DCI is located is not scheduled, so that the terminal device may disable a front-end module such as a downlink data radio frequency module and disable buffering of received downlink data within PDCCH decoding time, to enter a sleep state in advance to save power consumption.

According to a second aspect, a wireless communication method is provided. The method includes: A network device configures a first value set and a second value set that are of slot offsets for a terminal device, where all slot offsets in the first value set are greater than a first threshold, and at least one slot offset in the second value set is the first threshold; and the slot offset is used to indicate an offset in a quantity of slots of a downlink control information DCI-scheduled physical downlink shared channel (PDSCH) relative to the DCI. The network device determines, based on a first parameter, to select a slot offset from the first value set or the second value set. The network device sends, to the terminal device, DCI that carries the slot offset.

According to the wireless communication method in this embodiment of this application, the network device configures different value sets of slot offsets for the terminal device, and selects, based on the first parameter of the terminal device, a value set corresponding to the first parameter, so that when the terminal device uses different first parameters, different corresponding scheduling manners are used, to quickly adapt to a change in data traffic, reduce a requirement such as a latency of a data channel, reduce power consumption, and improve a power saving effect.

With reference to the second aspect, in some implementations of the second aspect, the first parameter includes at least one of the following:
  a quantity of receive antennas currently used by the terminal device, a periodicity at which the terminal device detects a search space set, a type of a timer run by the terminal device, and first information carried in a previous piece of DCI received by the terminal device.

According to the wireless communication method in this embodiment of this application, the terminal device selects a value set of slot offsets based on a value of an operating parameter, where different value sets correspond to different scheduling manners. In this way, the terminal device flexibly selects a scheduling mechanism based on the operating parameter used to meet requirements such as power saving or latency reduction.

With reference to the second aspect, in some implementations of the second aspect, the first parameter is the quantity of receive antennas currently used by the terminal device, and that the network device determines, based on a first parameter, to select a slot offset from the first value set or the second value set includes: The network device determines to select the slot offset from the first value set when the quantity of receive antennas currently used by the terminal device is a first quantity of antennas; and the network device determines to select the slot offset from the second value set when the quantity of receive antennas currently used by the terminal device is a second quantity of antennas, where the first quantity of antennas is less than the second quantity of antennas.

According to the wireless communication method in this embodiment of this application, when the used quantities of receive antennas are different, the terminal device selects a value set of slot offsets corresponding to a currently used quantity of antennas, so that the terminal device can select a corresponding scheduling mechanism based on a requirement, to adapt to a change in data traffic, reduce impact on a latency and a throughput, and reduce power consumption.

With reference to the second aspect, in some implementations of the second aspect, the first parameter is the periodicity at which the terminal device detects the search space set, and that the network device determines, based on a first parameter, to select a slot offset from the first value set or the second value set includes: The network device determines to select the slot offset from the first value set when the periodicity at which the terminal device detects the search space set is a first detection periodicity; and the network device determines to select the slot offset from the second value set when the periodicity at which the terminal device detects the search space set is a second detection periodicity, where the first detection periodicity is greater than the second detection periodicity.

According to the wireless communication method in this embodiment of this application, when the periodicities at which the terminal device detects the search space set are different, the terminal device selects a value set of slot offsets corresponding to a current periodicity, so that the terminal device can select a corresponding scheduling mechanism based on a requirement, to adapt to a change in data traffic, reduce impact on a latency and a throughput, and reduce power consumption.

With reference to the second aspect, in some implementations of the second aspect, when the terminal device is within DRX active time, the first parameter is the type of the timer run by the terminal device; and that the network device determines, based on a first parameter, to select a slot offset from the first value set or the second value set includes: The network device determines to select the slot offset from the first value set when the terminal device runs only an on duration timer; the network device determines to select the slot offset from the second value set when the terminal device runs a same-slot scheduling timer, where the same-slot scheduling timer is started or restarted when the terminal device detects a physical downlink control channel PDCCH; and the terminal device selects the first value set when the same-slot scheduling timer expires.

According to the wireless communication method in this embodiment of this application, when the types of the timer used by the terminal device are different, a value set of slot offsets corresponding to the type of the timer is selected, so that the terminal device can select a corresponding scheduling mechanism based on a requirement, to adapt to a change in data traffic, reduce impact on a latency and a throughput, and reduce power consumption.

With reference to the second aspect, in some implementations of the second aspect, the first parameter is the first information carried in the previous piece of DCI received by the terminal device, and the first information is used to indicate the first value set or the second value set; and that the network device determines, based on a first parameter, to select a slot offset from the first value set or the second value set includes: The network device determines to select the slot offset from the first value set when the first information is used to indicate the first value set; and the network device determines to select the slot offset from the second value set when the first information is used to indicate the second value set.

According to the wireless communication method in this embodiment of this application, the terminal device can determine, based on an indication value in the DCI, a value set of slot offsets used for PDSCH scheduling, to quickly adapt to a change in data traffic, reduce a latency of a data channel, and improve a power saving effect.

With reference to the second aspect, in some implementations of the second aspect, the first information occupies at least one bit in a time domain resource assignment information field of the DCI.

With reference to the second aspect, in some implementations of the second aspect, the slot offset in the first value set is a slot offset in a first allocation table, and the slot offset in the second value set is a slot offset in a second allocation table; or both the slot offset in the first value set and the slot offset in the second value set are slot offsets in a third allocation table.

With reference to the second aspect, in some implementations of the second aspect, when the determined value set is the first value set, a scheduling manner of the PDSCH is cross-slot scheduling; and/or when the determined value set is the second value set, a scheduling manner of the PDSCH is same-slot scheduling.

According to the wireless communication method in this embodiment of this application, the terminal device determines the scheduling manner of the PDSCH by determining different value sets of slot offsets.

It should be understood that, during the cross-slot scheduling, the terminal device may learn, at least one slot in advance, that a slot in which the current DCI is located is not scheduled, so that the terminal device may disable a front-end module such as a downlink data radio frequency module and disable buffering of received downlink data within PDCCH decoding time, to enter a sleep state in advance to save power consumption.

According to a third aspect, a wireless communication apparatus is provided. The apparatus may be a terminal device, or may be a chip in the terminal device. The apparatus may include a processing unit and a transceiver unit. When the apparatus is the terminal device, the processing unit may be a processor, and the transceiver unit may be a transceiver. The terminal device may further include a storage unit, and the storage unit may be a memory. The storage unit is configured to store instructions, and the processing unit executes the instructions stored in the storage unit, so that the terminal device performs a corresponding function in the first aspect. When the apparatus is the chip in the terminal device, the processing unit may be a processor, and the transceiver unit may be an input/output interface, a pin, a circuit, or the like. The processing unit executes instructions stored in a storage unit, so that the terminal device performs a corresponding function in the first aspect. The storage unit may be a storage unit (for example, a register or a cache) inside the chip, or may be a storage unit (for example, a read-only memory or a random access memory) that is located outside the chip and that is inside the terminal device.

According to a fourth aspect, a wireless communication apparatus is provided. The apparatus may be a network device, or may be a chip in the network device. The apparatus may include a processing unit and a transceiver unit. When the apparatus is the network device, the processing unit may be a processor, and the transceiver unit may be a transceiver. The network device may further include a storage unit, and the storage unit may be a memory. The storage unit is configured to store instructions, and the processing unit executes the instructions stored in the storage unit, so that the network device performs a corresponding function in the first aspect. When the apparatus is the chip in the network device, the processing unit may be a processor, and the transceiver unit may be an input/output interface, a pin, a circuit, or the like. The processing unit executes instructions stored in a storage unit, so that the network device performs a corresponding function in the first aspect. The storage unit may be a storage unit (for example, a register or a cache) inside the chip, or may be a storage unit (for example, a read-only memory or a random access memory) that is located outside the chip and that is inside the network device.

According to a fifth aspect, a computer program product is provided. The computer program product includes computer program code, and when the computer program code is run by a communication device (for example, a terminal device or a network device), the communication device is enabled to perform the method according to any one of the first aspect, the second aspect, the implementations of the first aspect, or the implementations of the second aspect.

According to a sixth aspect, a computer-readable storage medium is provided. The computer-readable storage medium stores a program, and the program enables a communication device (for example, a terminal device or a network device) to perform the method according to any one of the first aspect, the second aspect, the implementations of the first aspect, or the implementations of the second aspect.

DESCRIPTION OF EMBODIMENTS

The following describes technical solutions of this application with reference to the accompanying drawings.

The technical solutions in the embodiments of this application may be used in various communication systems, for example, a global system for mobile communications (GSM), a code division multiple access (CDMA) system, a wideband code division multiple access (WCDMA) system, a general packet radio service ( ) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, and a future 5th generation (5G) system, or a new radio (NR) system.

A terminal device in the embodiments of this application may be user equipment, an access terminal, a subscriber unit, a subscriber station, a mobile station, a mobile console, a remote station, a remote terminal, a mobile device, a user terminal, a terminal, a wireless communication device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in the embodiments of this application.

A network device in the embodiments of this application may be a device configured to communicate with a terminal device. The network device may be a base transceiver station (BTS) in a global system for mobile communications (GSM) or a code division multiple access (CDMA) system, a NodeB (NB) in a wideband code division multiple access (WCDMA) system, an evolved NodeB (eNB or eNodeB) in an LTE system, or a radio controller in a cloud radio access network (CRAN) scenario. Alternatively, the network device may be a relay node, an access point, a vehicle-mounted device, a wearable device, a network device in a future 5G network, a network device in a future evolved PLMN network, or the like. This is not limited in the embodiments of this application.

Figure 1:
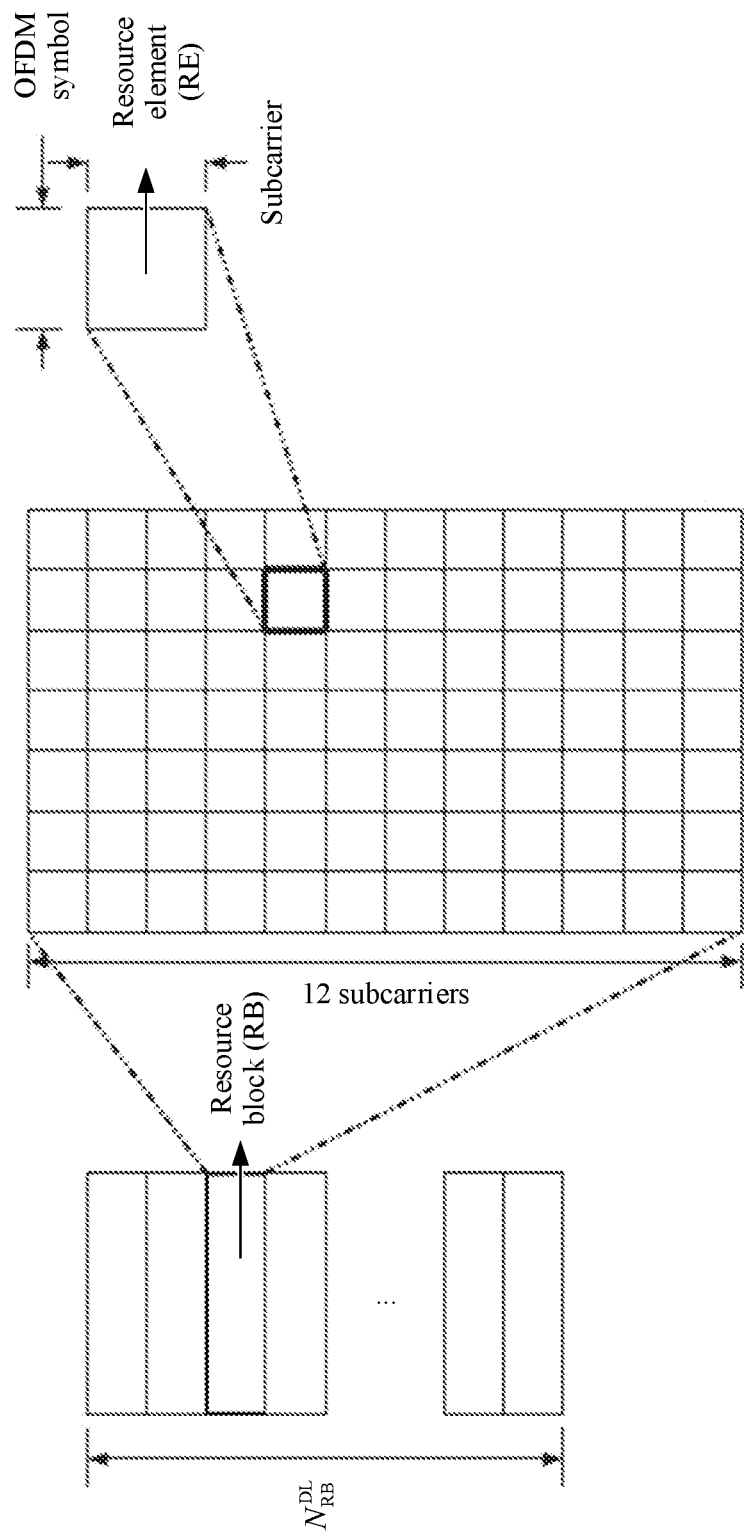
FIG. 1 is a schematic diagram of a downlink time-frequency resource grid.

FIG. 1 is a schematic diagram of a downlink time-frequency resource grid. As shown in FIG. 1, for example, in a communication system of a fifth generation radio access system standard NR, a basic unit in frequency domain is one subcarrier, and a subcarrier spacing (SCS) may be 15 kHz, 30 kHz, or the like. At an NR physical layer, a unit of an uplink or downlink frequency domain resource is a physical resource block (PRB), and each PRB includes 12 consecutive subcarriers in frequency domain.

As shown in FIG. 1, each element in the resource grid is referred to as a resource element (RE), and the RE is a minimum physical resource and includes one subcarrier in one orthogonal frequency division multiplexing (OFDM) symbol. An uplink time-frequency resource grid is similar to a downlink time-frequency resource grid, and details are not described herein again. A basic time unit for downlink resource scheduling in NR is a slot. Generally, one slot may include 14 OFDM symbols in time domain.

It should be understood that FIG. 1 is merely a schematic diagram of an example shown for describing a physical resource, and constitutes no limitation on this application.

FIG. 1 briefly describes composition of a physical resource. The following describes a same-slot scheduling manner and a cross-slot scheduling manner in an embodiment of this application with reference to FIG. 2.

Figure 2:
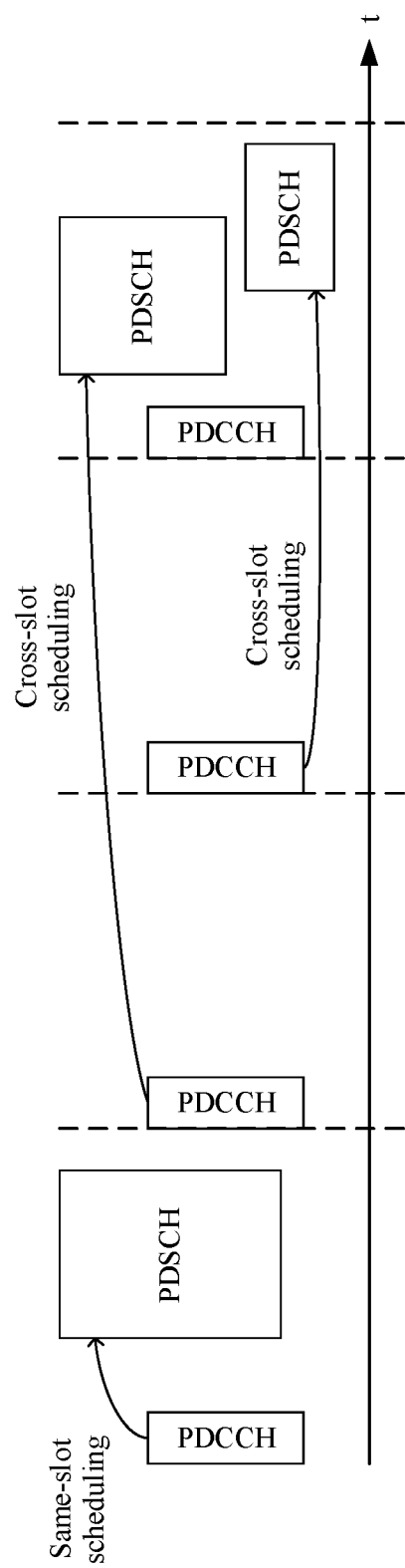
FIG. 2 is a schematic diagram of a same-slot scheduling manner and a cross-slot scheduling manner.

FIG. 2 is a schematic diagram of a same-slot scheduling manner and a cross-slot scheduling manner. A network device transmits a physical downlink shared channel PDSCH and a physical downlink control channel PDCCH for a terminal device. DCI carried on the PDCCH includes related information for receiving the PDSCH, and the related information may be, for example, a location and a size of a time-frequency resource of the PDSCH, or multi-antenna configuration information. Therefore, to correctly receive the PDSCH, the terminal device needs to first demodulate the PDCCH. The PDCCH is transmitted in a control-resource set (CORESET). The CORESET includes a plurality of PRBs in frequency domain. The CORESET includes one to three OFDM symbols in time domain, and may be at any location in a slot.

In the NR system, both same-slot scheduling and cross-slot scheduling for the PDSCH are supported. As shown in FIG. 2, for the same-slot scheduling, the scheduled PDSCH and the PDCCH that schedules the PDSCH are located in a same slot. For example, in a slot n, both the scheduled PDSCH and the PDCCH that schedules the PDSCH are located in the slot. For the cross-slot scheduling, the scheduled PDSCH and the PDCCH that schedules the PDSCH are located in different slots. For example, if subcarrier spacings of the PDCCH and the PDSCH are the same, the PDCCH is located in a slot (n+1) or a slot (n+2), and the PDSCH is in a slot (n+3). In this case, the cross-slot scheduling is performed on the PDSCH.

Figure 3:
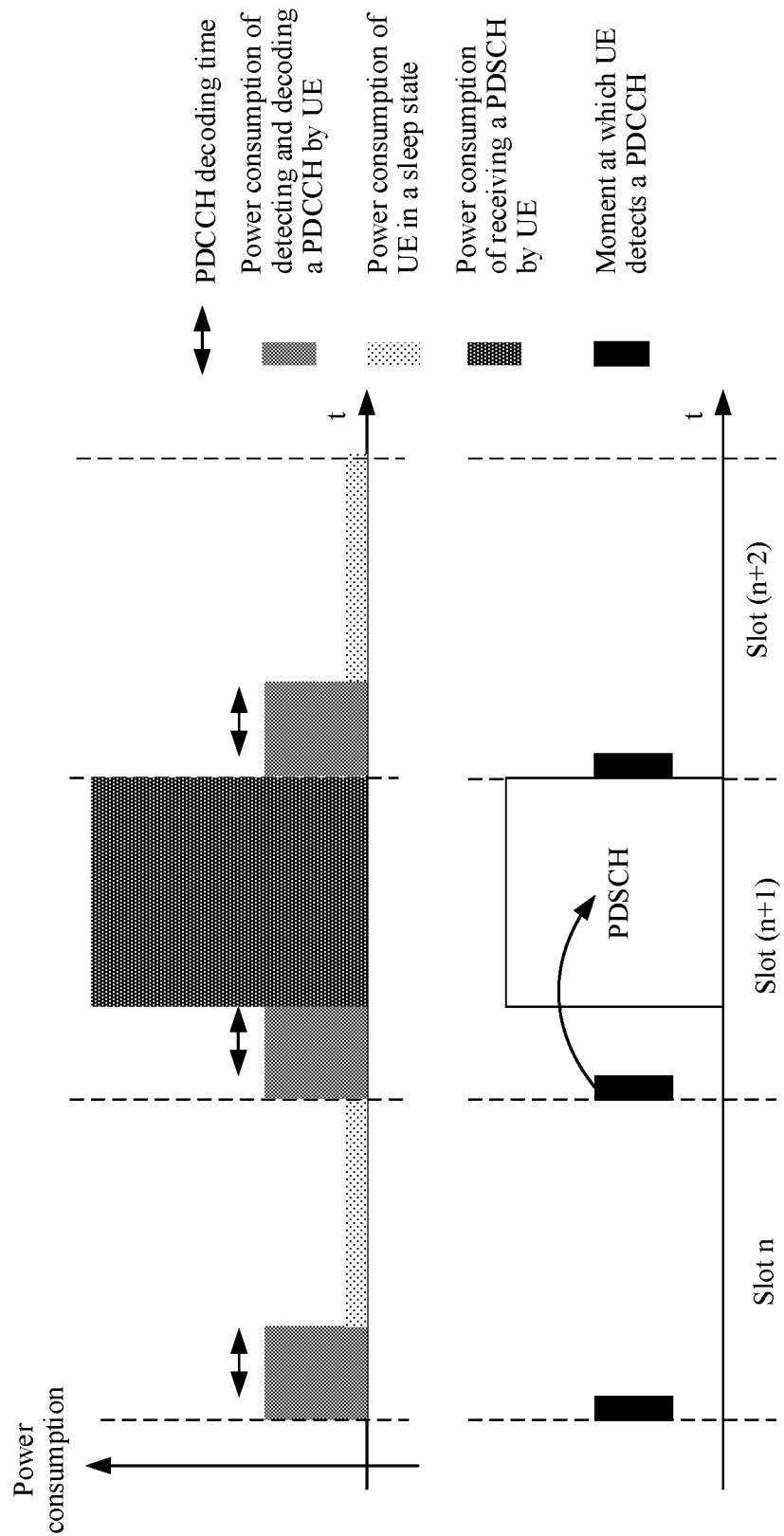
FIG. 3 is a schematic diagram of power consumption in a same-slot scheduling mechanism.
Figure 4:
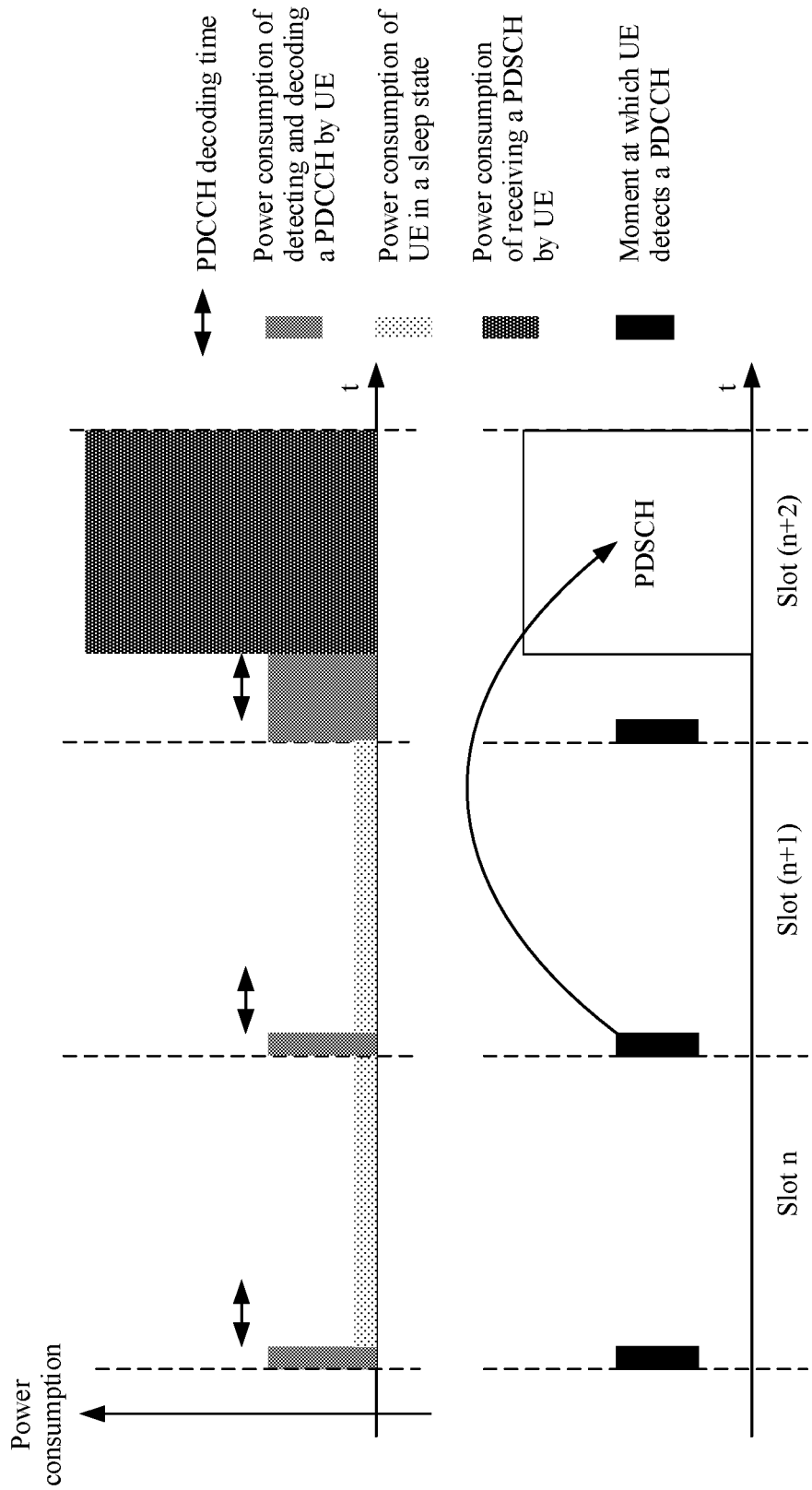
FIG. 4 is a schematic diagram of power consumption in a cross-slot scheduling mechanism.

Compared with the same-slot scheduling, the cross-slot scheduling allows the terminal device to use some power saving methods to reduce power consumption of the terminal device. With reference to FIG. 3 and FIG. 4, the following describes power consumption in same-slot scheduling and power consumption in cross-slot scheduling.

FIG. 3 is a schematic diagram of power consumption in same-slot scheduling. FIG. 4 is a schematic diagram of power consumption in cross-slot scheduling. As shown in FIG. 3, for the same-slot scheduling, the terminal device cannot learn of whether data is scheduled within PDCCH decoding time, that is, before DCI is obtained through decoding. Therefore, downlink data received in this period of time needs to be buffered, and a front-end module such as a radio frequency module needs to be enabled. The terminal device enters a sleep state after this period of time if there is no PDSCH transmission in the slot, and therefore the terminal device consumes more power. However, as shown in FIG. 4, a power saving method for the cross-slot scheduling is as follows: If the terminal device learns, at least one slot in advance, that there is no scheduling in a current slot, the terminal device may disable a front-end module such as a downlink data radio frequency module and disable buffering of received downlink data within PDCCH decoding time, to enter a sleep state in advance to save power of the terminal device.

In the current Release 15 protocol, a time domain position of a PDSCH may be dynamically indicated by DCI. When the DCI is used to schedule the terminal device for receiving on the PDSCH, the DCI includes a time domain resource assignment (time domain resource assignment) information field, and the DCI may indicate information about the time domain position of the PDSCH by using the time domain resource assignment information field. The terminal device obtains, based on the time domain resource assignment information field in the DCI on the detected PDCCH, the information about the time domain position of the DCI-scheduled PDSCH. The information about the time domain position may include: a slot in which the PDSCH is located, a time domain length of the PDSCH, a start OFDM symbol index of the PDSCH in the slot, and the like. In addition, 0 in the DCI indicates the first piece of information in an allocation table (allocation table), and 1 indicates the second piece of information, and the rest is deduced by analogy. In other words, if a value of the time domain resource assignment information field is m, the terminal device may obtain the allocation table from a row whose index number of the allocation table is m+1. In addition, if the assignment information field has a total of n bits, the allocation table may have a total of $2^n$ rows.

Each row in the allocation table includes a slot offset K0. When subcarrier spacings of the PDSCH and the PDCCH are the same, if the terminal device receives the DCI for scheduling in a slot n, the DCI-scheduled PDSCH is in a slot (n+K0). However, when subcarrier spacings of the PDSCH and the PDCCH are different, if the terminal device receives the DCI for scheduling in a slot n, the DCI-scheduled PDSCH is in a slot $$\left\lfloor n \cdot \frac{2^{\mu PDSCH}}{2^{\mu PDCCH}} \right\rfloor + K0,$$

and μPDSCH and μPDCCH are subcarrier spacings of the PDSCH and the PDCCH respectively. Therefore, K0=0 indicates same-slot scheduling; K0>0 indicates cross-slot scheduling. FIG. 4 shows a cross-slot scheduling manner when K0=1.

It should be understood that, if the network device configures the slot offset included in each row in the allocation table to be greater than 0, the terminal learns in advance that the DCI-scheduled PDSCH and the DCI are located in different slots before the terminal device decodes the DCI regardless of the value of the time domain resource assignment information field. In this case, cross-slot scheduling is used. In addition, if the slot in which the DCI is located is not used for transmission of a PDSCH scheduled by using another DCI, the terminal device may directly enter a sleep state after detecting the PDCCH to save power, as shown in FIG. 4.

Therefore, to obtain a power saving effect of cross-slot scheduling, it needs to be ensured that all slot offsets configured by a base station by using higher layer signaling are greater than 0. However, arrival of data is often uncertain, bursty, and sparse in an actual data transmission process. If the network device keeps using cross-slot scheduling, a latency and a throughput of data transmission are adversely affected. Therefore, in some cases where a low latency is required, the network device needs to use same-slot scheduling. In this case, the network device needs to reconfigure slot offsets in the allocation table by using higher layer signaling, to ensure that at least one slot offset is 0.

To resolve a problem that a data channel scheduling manner cannot be flexibly changed in an existing solution to adapt to a fast change in data traffic, this application provides a mechanism in which a scheduling mechanism can be dynamically changed between cross-slot scheduling and same-slot scheduling (that is, the value of K0 in the allocation table is dynamically adjusted), to adapt to changes in data traffic, reduce the impact on a latency and a throughput, and improve a power saving effect.

For ease of understanding of the technical solutions of this application, the following briefly describes several basic concepts in the technical solutions of this application.

1. Physical Downlink Control Channel

Figure 5:
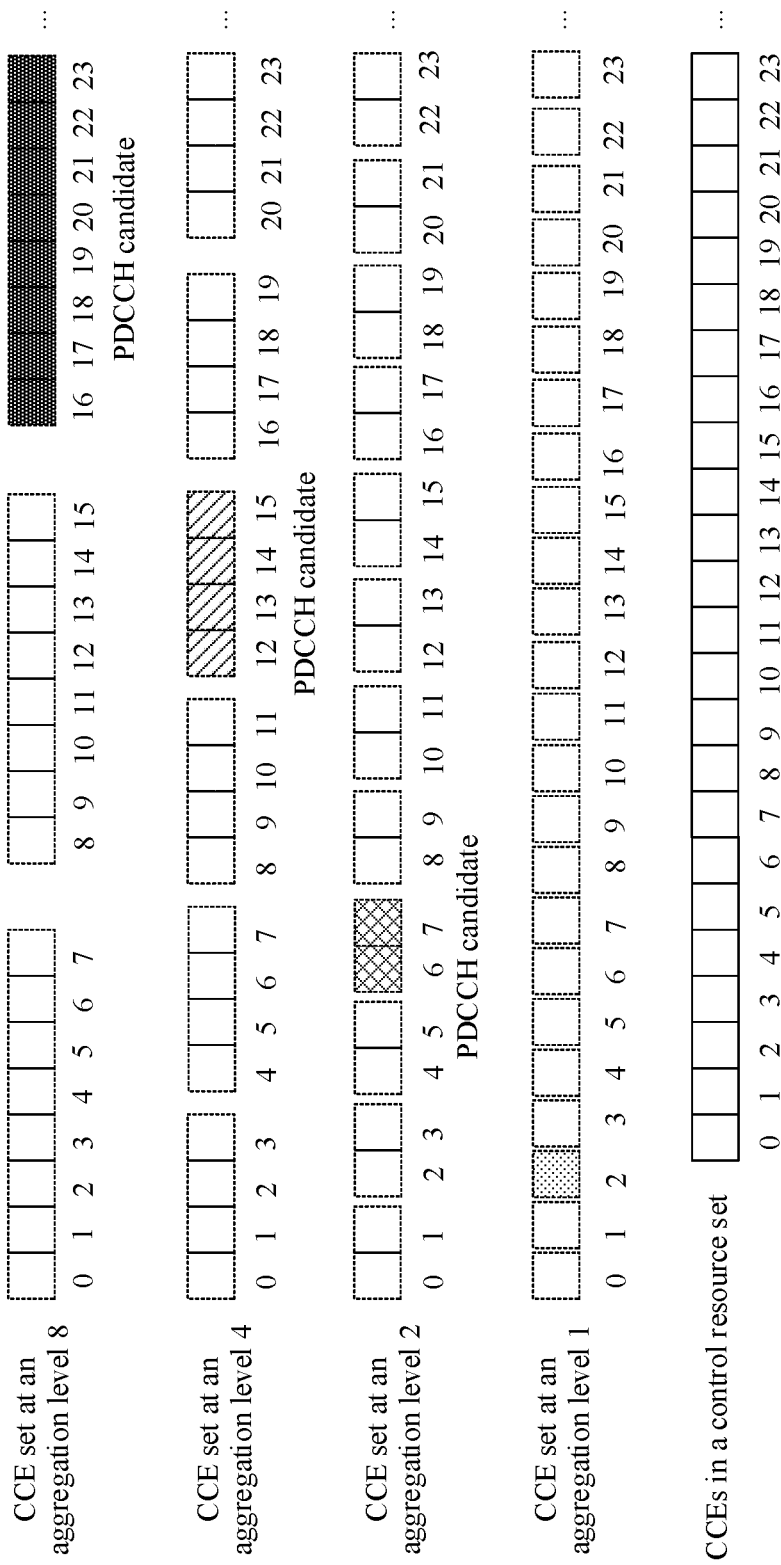
FIG. 5 is a schematic diagram of CCE sets of PDCCH candidates.
Figure 6:
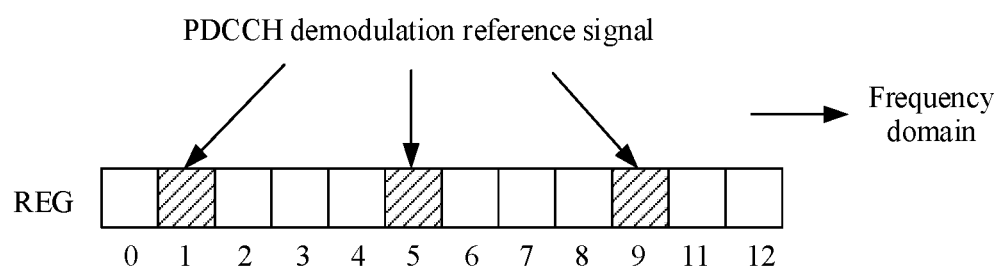
FIG. 6 is a schematic structural diagram of a REG resource.

A physical downlink control channel PDCCH consists of control channel elements (CCEs). Each CCE in a CORESET has a corresponding index number (as shown in FIG. 5). A given PDCCH may include 1, 2, 4, 8, or 16 CCEs, and a specific quantity of the CCEs is determined by a DCI payload size and a required encoding rate. A quantity of CCEs included in the PDCCH is also referred to as an aggregation level (aggregation level, AL). A base station may adjust the aggregation level of the PDCCH based on a status of a radio channel in actual transmission, to implement link adaptation transmission. One CCE corresponds to six resource element groups (REGs) from a physical resource perspective. The REG occupies one OFDM symbol in time domain, and occupies one resource block in frequency domain (that is, includes 12 consecutive subcarriers in frequency domain). FIG. 6 is a schematic structural diagram of a REG resource.

A mapping relationship between the CCE and the REGs may be classified into interleaved mapping and non-interleaved mapping. Different mapping manners may be configured by using higher layer signaling. In interleaved mapping, the REGs to which the CCE maps may be distributed in the entire CORESET to obtain frequency diversity gains. However, in non-interleaved mapping, the REGs to which the CCE maps may be aggregated on some time-frequency resources in the CORESET.

2. Search Space

A search space is a set of PDCCH candidates at an aggregation level (AL). Because an aggregation level of a PDCCH actually sent by a network device changes with time, and because there is no related signaling used to notify a terminal device, the terminal device needs to blindly detect a PDCCH at different aggregation levels, and the PDCCH that is to be blindly detected is referred to as a PDCCH candidate. There may be a plurality of PDCCH candidates at one aggregation level. The terminal device decodes all PDCCH candidates including CCEs in the search space. If a cyclic redundancy check (CRC) succeeds, the terminal device considers that content of the decoded PDCCH is valid for the terminal device, and processes the related information obtained through decoding. A CCE set of the PDCCH candidates is shown in FIG. 6.

In NR, to better control complexity of blind detection of a downlink control channel, a network device may configure one or more search space sets (search space set) for the terminal device, where each search space set includes search spaces of one or more aggregation levels. In other words, the search space set includes search spaces of one or more aggregation levels and a quantity of PDCCH candidates corresponding to each aggregation level.

Figure 7:
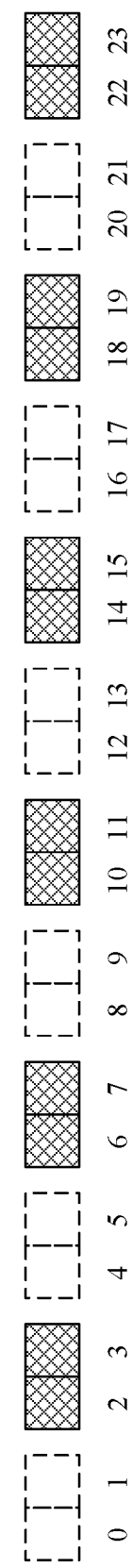
FIG. 7 is a schematic diagram of CCE index numbers of CORESETs of PDCCH candidates in a search space set.

When configuring a search space set for the terminal device, the network device configures an index number for each search space set and an index number of a CORESET associated with the search space set, where the associated CORESET determines a CCE index of a PDCCH candidate in the search space set in the CORESET. For example, there are 24 CCEs in the CORESET in total, and a quantity of PDCCH candidates corresponding to an aggregation level (AL) 2 in the search space set is 6. In this case, a CCE index number of each PDCCH candidate in the CORESET may be shown in FIG. 7.

In time domain, the terminal device detects PDCCH candidates in a search space set at a specific time interval. Therefore, some time domain configuration information is configured for each search space set, including the following information.

Detection periodicity: A time interval in a unit of slot for detecting a search space set.

Slot offset: A slot offset from a start of a detection periodicity to actual detection of a search space set, and the offset is less than a value of the detection periodicity. The slot offset is denoted as K0 in this embodiment of this application.

Quantity of slots: A quantity of consecutive slots in which a search space set is detected, and the quantity of slots is less than a value of a detection periodicity.

Symbol location: A location of a start symbol of a CORESET associated with a search space set in each slot.

Figure 8:
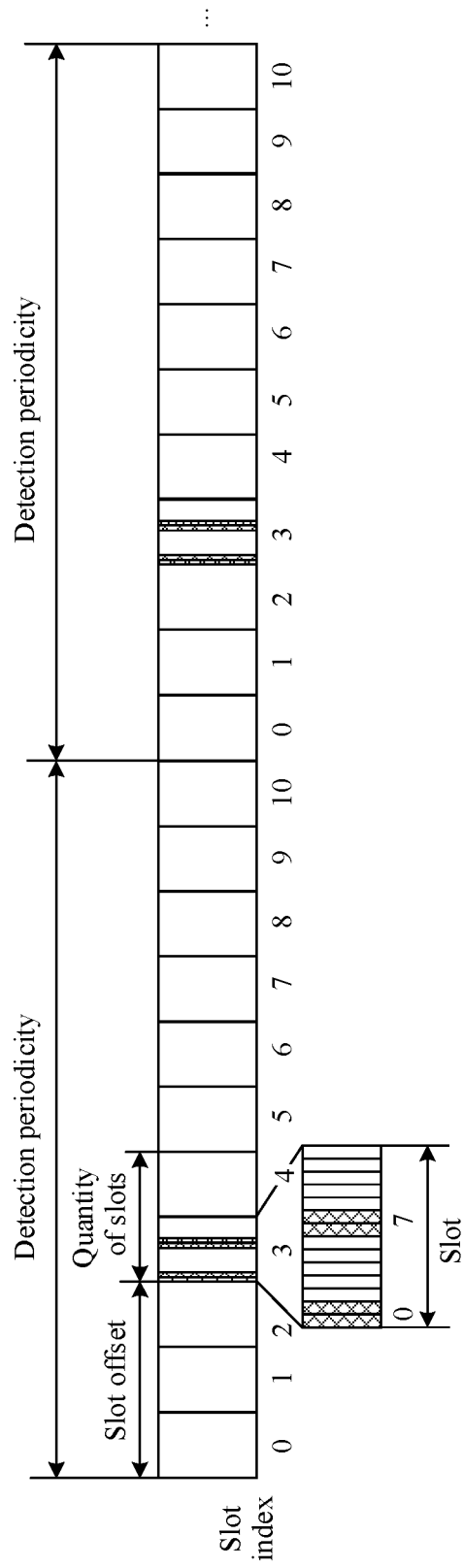
FIG. 8 is a schematic diagram of a time domain position of a search space set.

For easy understanding, an example is used to describe a meaning of each parameter. FIG. 8 is a schematic diagram of a time domain position of a search space set. As shown in FIG. 8, a detection periodicity at which a terminal device detects a PDCCH in a search space set is 10 slots, a slot offset is 3 slots, and a quantity of slots is 2. A CORESET associated with the search space set occupies two OFDM symbols, and symbol locations are OFDM symbol 0 and OFDM symbol 7 in a slot. To be specific, the terminal device detects a PDCCH candidate in a search space set in a CORESET on symbol 0 and symbol 7 in slot 3 and slot 4 in each 10-slot periodicity, and the CORESET occupies two OFDM symbols in time domain.

In addition, some other information is configured for the search space set, including the following information.

Aggregation level size: Aggregation level information included in the search space set. The value range is {1, 2, 4, 8, 16}.

Quantity of candidate control channels: Quantity of PDCCH candidates in the search space corresponding to each aggregation level.

In NR, a terminal may be in different states, and one state is a radio resource control-connected (RRC-connected) state. In the RRC-connected state, the terminal device has established an RRC context. That is, a parameter necessary for communication between the terminal device and a radio access network is known to both the terminal device and the radio access network. The RRC-connected state is mainly used in sending/receiving data from the terminal.

3. Discontinuous Reception Mechanism

Generally, a packet-based data stream is usually bursty. There is data transmission in a time period, but there is no data transmission in a subsequent relatively long time period. Therefore, a discontinuous reception (DRX) processing procedure may be configured for a terminal device in NR. When there is no data transmission, the terminal device may be enabled to stop detecting a PDCCH and stop receiving corresponding data, to reduce power consumption and prolong a battery lifespan.

Figure 9:
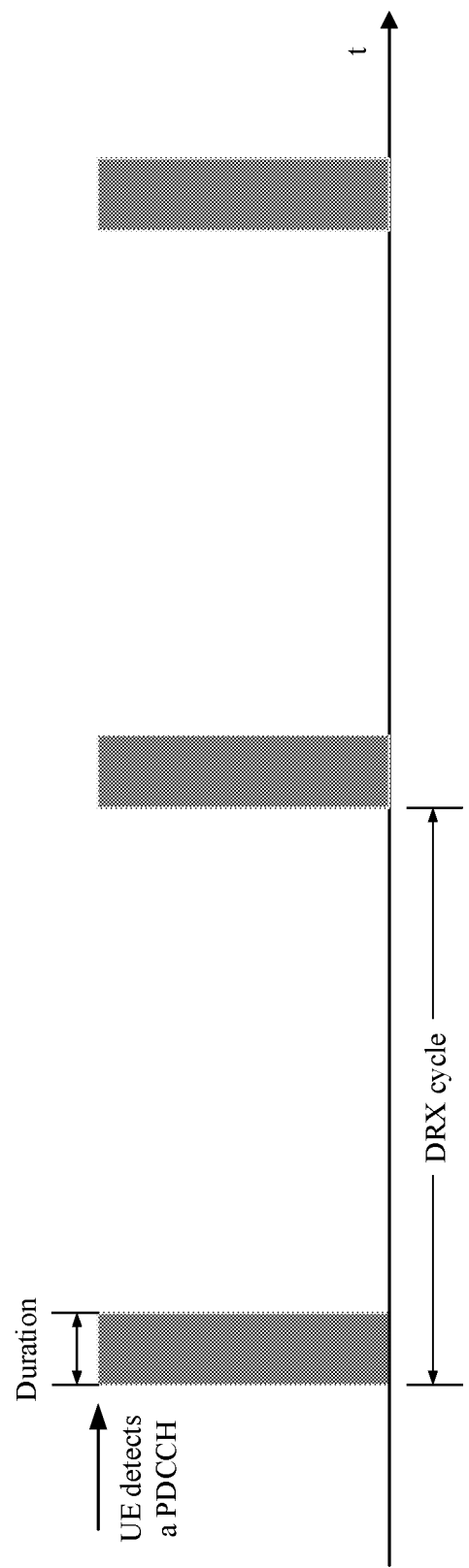
FIG. 9 is a schematic diagram of a DRX cycle.

In DRX, a network device may configure a DRX cycle for the terminal device in an RRC-connected state. The DRX cycle includes a time range of "on duration", as shown in FIG. 9.

Figure 10:
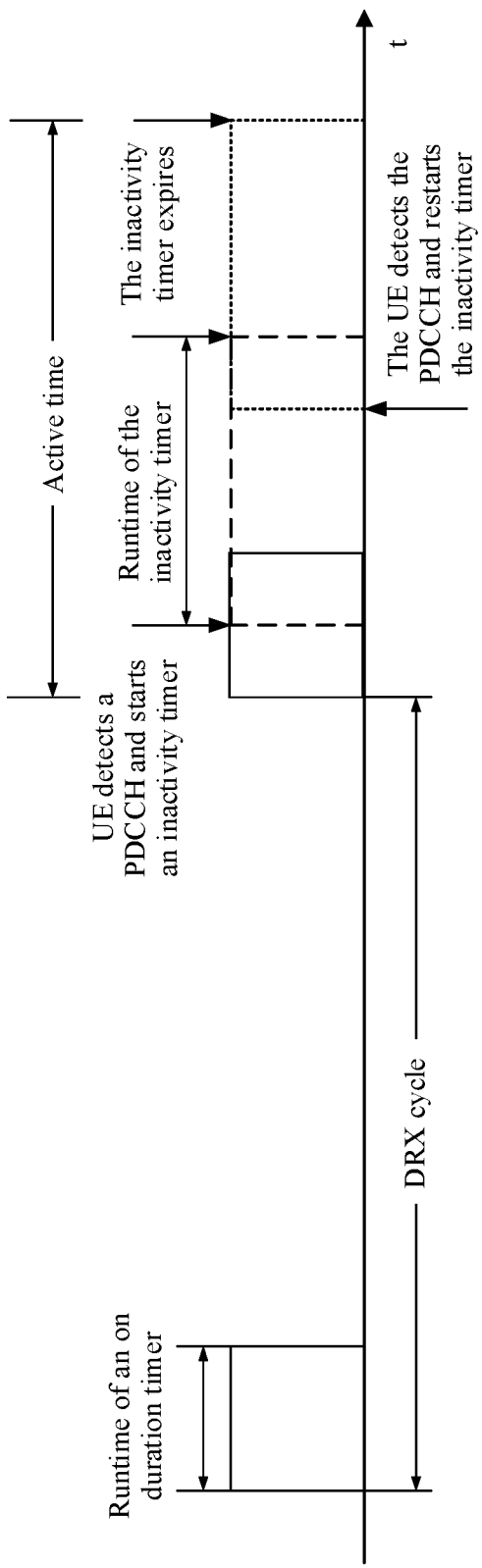
FIG. 10 is a schematic diagram of running processes of different types of timers.

In the time range of "on duration", the terminal device may detect a PDCCH. The terminal device starts a timer at a time start location of each DRX cycle (that is, a time start location of "on duration"). Duration of the timer is a time length of "on duration". The timer may be referred to as an on duration timer (drx-on duration timer). A time range of the on duration timer is 1 to 1200 ms, and the terminal device can detect the PDCCH within the time range of the timer. If the terminal device detects no PDCCH within the time range of the on duration timer, the terminal device enters a sleep state when the timer expires. That is, the terminal device may disable a receive circuit in the remaining time period of the DRX cycle, to reduce power consumption of the terminal. If the terminal device detects a PDCCH within the time range of the duration timer, the terminal device starts an inactivity timer (drx-inactivity timer) in the DRX mechanism. If the terminal device detects another PDCCH within runtime of the inactivity timer, the terminal device restarts the inactivity timer for counting again. If the inactivity timer is running, the terminal device still needs to continue to detect the PDCCH until the inactivity timer expires even if the originally configured on duration timer expires (that is, the on duration ends). FIG. 10 is a schematic diagram of running processes of an on duration timer and an inactivity timer.

In a DRX mechanism, there are some other timers, for example, a DRX downlink retransmission timer (drx-retransmission timer DL) and a DRX uplink retransmission timer (drx-retransmission timer UL). The two timers are not described in detail in the technical solution of this application. If any one of the foregoing timers (including the on duration timer, the inactivity timer, the downlink/uplink retransmission timer, and the like) is running, the terminal device is in active time. In the DRX mechanism, if the terminal device is in the active time, the terminal device needs to detect the PDCCH. It should be understood that there are other cases in which the terminal device is in the active time. However, this embodiment of this application does not involve many cases. Therefore, details are not described herein again.

The following describes the embodiments of this application with reference to the accompanying drawings. The embodiments are described by using an example in which the first threshold is 0. However, the technical solution of this application is not limited thereto, and the first threshold may alternatively be another value.

It should be understood that the terminal device may use different parameters in different operating conditions. For example, when a channel state condition is relatively good or an amount of data is relatively small, the network device may enable the terminal device to use fewer receive antennas to receive data (for example, two receive antennas, 2Rx for short). In other words, the terminal device may reduce power consumption by reducing a quantity of receive antennas. However, when a channel state condition is relatively poor or an amount of data is relatively large, the base station may enable the terminal device to use more receive antennas to receive data (for example, four receive antennas, 4Rx for short), thereby ensuring correct and reliable reception of the data. For example, when there is a relatively small amount of data for transmission, the terminal device may use a cross-slot scheduling mechanism to further reduce power consumption; when there is a relatively large amount of data, the terminal device may use a same-slot scheduling mechanism to reduce a latency. Therefore, in this embodiment of this application, scheduling methods are selected based on operating parameters of the terminal device.

The terminal device selects a first value set of slot offsets or a second value set of slot offsets based on a first parameter, where values of all slot offsets in the first value set are greater than 0, and at least one slot offset in the second value set is equal to 0. In addition, the first value set and the second value set are value sets of slot offsets that are configured by the network device and that correspond to the first parameter of the terminal device. In other words, there is a correspondence between different first parameters of the terminal device and the first value set or the second value set. The correspondence may be that if there is a correspondence between one first parameter and the first value set, the terminal device selects the first value set when the terminal device uses the first parameter. Because values of all slot offsets in the first value set are greater than 0, a data channel scheduling mechanism in this scenario is cross-slot scheduling.

It should be understood that the foregoing slot offset may be used to indicate an offset in a quantity of slots of a downlink control information DCI-scheduled PDSCH relative to the DCI. For example, if the DCI is in a slot n, and the DCI-scheduled PDSCH is in a slot (n+K0), the slot offset is K0.

Optionally, the terminal device may determine the scheduling mechanism based on the value of the slot offset. To be specific, when the terminal device determines the first value set of slot offsets, cross-slot scheduling is performed. In this case, the terminal device may learn in advance that no scheduling is performed in a slot in which the current DCI is located. Therefore, the terminal device may disable a front-end module such as a downlink data radio frequency module and disable buffering of received downlink data within PDCCH decoding time, to enter a sleep state in advance to save power of the terminal device.

Optionally, the first parameter of the terminal device may include one or more of a quantity of receive antennas currently used by the terminal device, a periodicity at which the terminal device detects a search space set, a type of a timer run by the terminal device, and first information carried in a previous piece of DCI received by the terminal device.

The following describes the embodiments of this application in detail with reference to the accompanying drawings.

Figure 11:
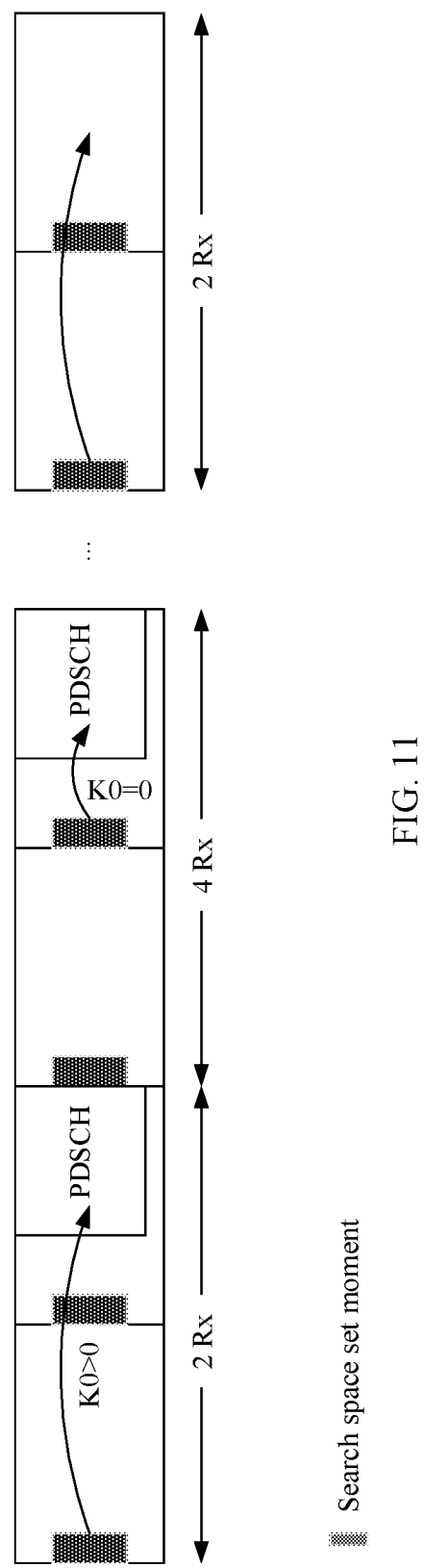
FIG. 11 is a schematic diagram of a wireless communication method according to an embodiment of this application.

FIG. 11 shows a wireless communication method according to an embodiment of this application. Specifically, in the wireless communication method shown in FIG. 11, a scheduling manner is determined based on a quantity of receive antennas of a terminal device.

When the quantity of receive antennas of the terminal device dynamically changes (for example, changes between 2Rx and 4Rx), or when a receive antenna quantity set of the terminal device dynamically changes, the terminal device may determine to select the first value set or the second value set corresponding to cross-slot scheduling or same-slot scheduling based on the quantity of receive antennas or the antenna quantity set.

For example, the terminal device selects the first value set when the quantity of receive antennas currently used by the terminal device is a first quantity of antennas; and the terminal device selects the second value set when the quantity of receive antennas currently used by the terminal device is a second quantity of antennas, where the first quantity of antennas is less than the second quantity of antennas. It should be understood that when channel quality is relatively good or an amount of data for transmission is relatively small, there may be two receive antennas of the terminal device. In this case, the terminal device may further reduce power consumption. Therefore, cross-slot scheduling may be considered to be used to further reduce the power consumption. In this case, the network device may establish a correspondence between the receiving antenna quantity 2Rx of the terminal device and the first value set, that is, a value set of slot offsets whose slot offsets are all greater than 0. The network device may configure the value set in a plurality of manners. This is not limited in this embodiment of this application.

In an example, when the quantity of receive antennas of the terminal device is 2, the network device may independently configure a first allocation table by using higher layer signaling, and all slot offsets in the first allocation table are greater than 0. In other words, the slot offsets in the first value set are the slot offsets in the first allocation table. Because the first allocation table is configured for a case in which the quantity of antennas of the terminal device is 2Rx, the first allocation table is associated with or has a correspondence with the antenna quantity 2Rx.

In another example, in a case in which the quantity of antennas of the terminal device is 2Rx, a third allocation table is configured, where a corresponding slot offset is configured for each row in the third allocation table. Specifically, the third allocation table may include value sets of slot offsets corresponding to different quantities of receive antennas of the terminal device. For example, the third allocation table may include the first value set of slot offsets when the quantity of antennas of the terminal device is 2Rx and the second value set of slot offsets when the quantity of antennas of the terminal device is 4Rx.

In addition, when the quantity of antennas of the terminal device is 4Rx, the network device may need to schedule data on consecutive slots for the terminal device. Therefore, same-slot scheduling may be considered to be used to reduce a data scheduling latency. In other words, a correspondence is established between the antenna quantity 4Rx of the terminal device and the second value set, that is, at least one slot offset is 0.

In an example, when the quantity of receive antennas of the terminal device is 4, the network device may independently configure a second allocation table by using higher layer signaling, and at least one slot offset in the second allocation table is equal to 0. In other words, the slot offsets in the second value set are the slot offsets in the second allocation table. Because the second allocation table is configured for a case in which the quantity of antennas of the terminal device is 4Rx, the second allocation table is associated with or has a correspondence with the antenna quantity 4Rx.

In another example, in a case in which the quantity of antennas of the terminal device is 4Rx, a third allocation table is configured, where a corresponding slot offset is configured for each row in the third allocation table. Specifically, the third allocation table may include value sets of slot offsets corresponding to different quantities of receive antennas of the terminal device. For example, the third allocation table may include the first value set of slot offsets when the quantity of antennas of the terminal device is 2Rx and the second value set of slot offsets when the quantity of antennas of the terminal device is 4Rx.

The terminal device may select a value set from the first value set of slot offsets and the second value set of slot offsets based on the quantity of receive antennas currently used by the terminal device.

In an example, when the quantity of antennas of the terminal device is 2Rx, the terminal device selects the first value set, and a corresponding scheduling manner is cross-slot scheduling. In this case, if the terminal device learns, before the current slot in which the DCI is located, that there is no DCI-scheduled PDSCH in the current slot, the terminal device may disable a front-end module such as a downlink data radio frequency module and disable buffering of received downlink data within PDCCH decoding time, to enter a sleep state in advance to save power of the terminal device.

In another example, when the quantity of antennas of the terminal device is 4Rx, the terminal device selects the second value set, so that a data channel may be scheduled in a same-slot scheduling manner or in a cross-slot scheduling manner. However, a corresponding scheduling manner used when the terminal device selects the second value set is not limited in this application.

Optionally, when the quantity of receive antennas of the terminal device changes (for example, changes between 2Rx and 4Rx), the terminal device may determine a corresponding allocation table or a slot offset in each row in the allocation table based on a corresponding quantity of receive antennas. Then, the terminal device determines a specific slot offset based on an indication value of a time domain resource assignment information field in the DCI, to determine whether to use the cross-slot scheduling for power saving.

Optionally, the terminal device may select a corresponding value set based on a set of quantities of antennas to which the quantity of antennas currently used by the terminal device belongs. For example, when the set of quantities of antennas to which the quantity of antennas currently used by the terminal device belongs is a first set of quantities of antennas, the terminal device selects the first value set of slot offsets; when the set of quantities of antennas to which the quantity of antennas currently used by the terminal device belongs is a second set of quantities of antennas, the terminal device selects the second value set of slot offsets, where each quantity of antennas in the first set of quantities of antennas is less than a quantity of antennas in the second set of quantities of antennas. For example, the quantities of antennas in the first set of quantities of antennas may be {1, 2}, and the quantities of antennas in the second set of quantities of antennas may be {4, 8}.

In this embodiment, a scheduling mechanism can be dynamically changed between cross-slot scheduling and same-slot scheduling (that is, slot offsets in the allocation table) based on the quantity of receive antennas of the terminal device, so that the terminal device can quickly adapt to a change in data traffic, reduce a latency of a data channel, and improve a power saving effect.

Figure 12:
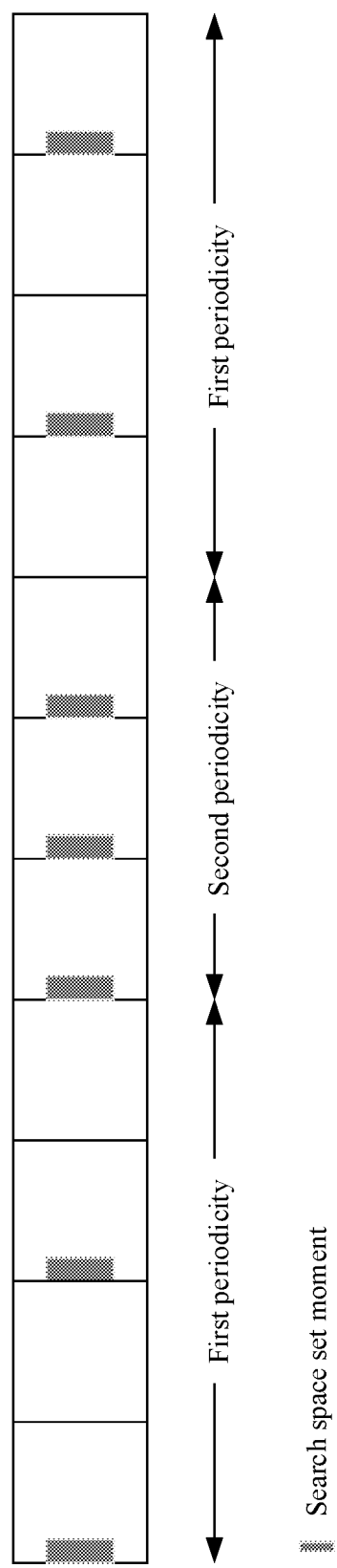
FIG. 12 is a schematic diagram of another wireless communication method according to an embodiment of this application.

FIG. 12 shows another wireless communication method according to an embodiment of this application. Specifically, in the wireless communication method shown in FIG. 12, a scheduling manner to be used is determined based on a detection periodicity at which a terminal device detects a search space set.

Figure 13:
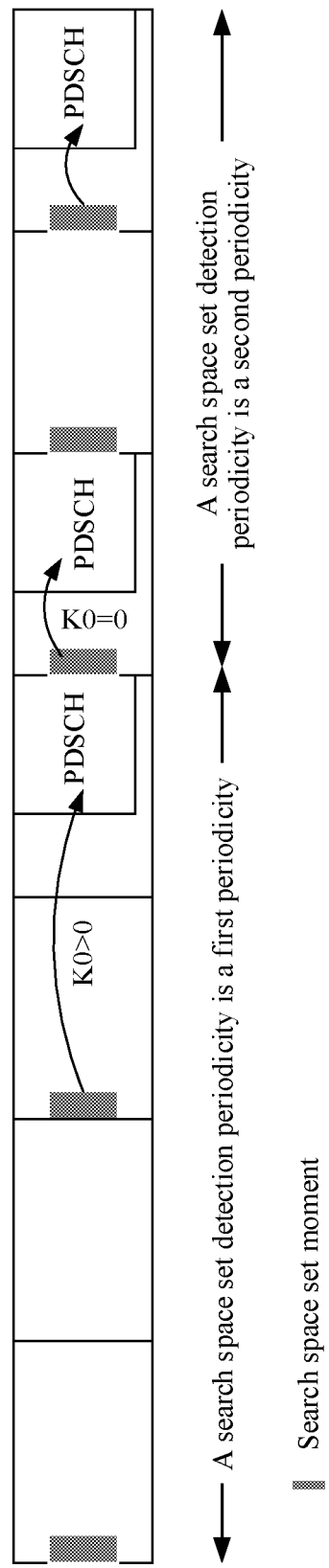
FIG. 13 is a schematic diagram of a dynamic change in a detection periodicity of a search space set according to this application.

When demodulating a PDCCH, the terminal device detects a PDCCH candidate in the search space set at a specific time interval, that is, the terminal device detects the search space set at a specific detection periodicity. In an existing NR standard, a detection periodicity of the search space set is semi-statically configured by using higher layer signaling. However, in evolution towards a future NR standard, the following case may occur: A search space set detected by the terminal device may dynamically change. As shown in FIG. 13, when the terminal device needs to save power, a base station may prolong the periodicity of search space detection for the terminal device, to reduce a quantity of times of PDCCH detection by the terminal device. However, when the base station schedules a data channel on consecutive slots for the terminal device, or the data channel requires a relatively low latency, the base station may shorten the periodicity of the search space detection for the terminal device.

In this embodiment, when configuring the search space set of the terminal device, the network device may configure two detection periodicities: a first detection periodicity and a second detection periodicity. The first detection periodicity is longer than the second detection periodicity. For example, the first detection periodicity is 8 ms, and the second detection periodicity is 2 ms.

The network device may configure different value sets of slot offsets for different detection periodicities of the search space set. The different value sets of slot offsets correspond to different data channel scheduling mechanisms, that is, a same-slot scheduling mechanism or a cross-slot scheduling mechanism.

When the terminal device detects the search space set at the first detection periodicity, cross-slot scheduling may be considered to be used to further reduce the power consumption. Therefore, the network may select, as the first value set, a value set corresponding to the detection periodicity of the search space set being the first detection periodicity, that is, all slot offsets are greater than 0. In this case, cross-slot scheduling is used. If the terminal device learns, before the current slot in which the DCI is located, that there is no DCI-scheduled PDSCH in the current slot, the terminal device may disable a front-end module such as a downlink data radio frequency module and disable buffering of received downlink data within PDCCH decoding time, to enter a sleep state in advance to save power of the terminal device. The network device may configure the value set in a plurality of manners. This is not limited in this embodiment of this application.

In an example, when the terminal device detects the search space set at the first detection periodicity, the network device may independently configure a first allocation table by using higher layer signaling, and all slot offsets in the first allocation table are greater than 0. In other words, the slot offsets in the first value set are the slot offsets in the first allocation table. Because the first allocation table is configured for a case in which the terminal device detects the search space set at the first detection periodicity, the first allocation table is associated with or has a correspondence with the first detection periodicity.

In another example, in a case in which the terminal device detects the search space set at the second detection periodicity, the network device may configure a third allocation table, where a corresponding slot offset is configured for each row in the third allocation table. Specifically, the third allocation table may include value sets of slot offsets that respectively correspond to different detection periodicities of the search space by the terminal device. For example, the third allocation table may include the first value set of slot offsets when the detection periodicity is the first detection periodicity and the second value set of slot offsets when the detection periodicity of the terminal device is the second detection periodicity.

In addition, when the terminal device detects the search space set at the second detection periodicity, the network device may need to schedule data on consecutive slots for the terminal device. Therefore, same-slot scheduling may be considered to be used to reduce a data scheduling latency and to shorten the detection periodicity. In other words, when the detection periodicity of the terminal device is the second detection periodicity, the second value set is used, that is, at least one slot offset is 0.

In an example, when the terminal device detects the search space set at the second detection periodicity, the network device may independently configure a second allocation table by using higher layer signaling, and at least one slot offset in the second allocation table is equal to 0. In other words, the slot offsets in the second value set are the slot offsets in the second allocation table. Because the second allocation table is configured for a case in which the detection periodicity of the terminal device is the second detection periodicity, the second allocation table is associated with or has a correspondence with the second detection periodicity.

In another example, when the terminal device detects the search space set at the second detection periodicity, a third allocation table is configured, where a corresponding slot offset is configured for each row in the third allocation table. Specifically, the third allocation table may include value sets of slot offsets that respectively correspond to different detection periodicities by the terminal device. For example, the third allocation table may include the first value set of slot offsets when the terminal device detects the search space set at the first detection periodicity and the second value set of slot offsets when the terminal device detects the search space set at the second detection periodicity.

The terminal device may select a corresponding value set from the first value set of slot offsets and the second value set of slot offsets based on the current detection periodicity at which the terminal device detects the search space set. The detection periodicity is the first detection periodicity or the second detection periodicity.

In an example, when the terminal device detects the search space set at the first detection periodicity, the terminal device selects the first value set, and a corresponding scheduling manner is cross-slot scheduling. In this case, if the terminal device learns, before the current slot in which the DCI is located, that there is no DCI-scheduled PDSCH in the current slot, the terminal device may disable a front-end module such as a downlink data radio frequency module and disable buffering of received downlink data within PDCCH decoding time, to enter a sleep state in advance to save power of the terminal device.

In another example, when the terminal device detects the search space set at the second detection periodicity, the terminal device selects the second value set, so that a data channel may be scheduled in a same-slot scheduling manner or in a cross-slot scheduling manner. However, a corresponding scheduling manner used when the terminal device selects the second value is not limited in this application.

Optionally, when the detection periodicity of the terminal device on the search space set changes (for example, changes between the first detection periodicity and the second detection periodicity), the terminal device may determine a corresponding allocation table or a slot offset in each row in the allocation table based on a corresponding detection periodicity. Then, the terminal device determines a specific slot offset based on an indication value of a time domain resource assignment information field in the DCI, to determine whether to use the cross-slot scheduling for power saving.

Optionally, the terminal device may alternatively select the value set of slot offsets based on a detection periodicity set to which the detection periodicity at which the terminal device detects the search space set belongs. Specifically, the terminal device selects the first value set of slot offsets when the detection periodicity set to which the detection periodicity of the terminal device belongs is a first detection periodicity set, and the terminal device selects the second value set of slot offsets when the detection periodicity set to which the detection periodicity of the terminal device belongs is a second detection periodicity set, where duration of each periodicity in the first detection periodicity set is less than duration of each periodicity in the second detection periodicity set. For example, the duration of each detection periodicity in the first detection periodicity set may be {1 ms, 2 ms}, and the duration of each detection periodicity in the second detection periodicity set may be {4 ms, 8 ms}.

In this embodiment, a scheduling mechanism can be dynamically changed between cross-slot scheduling and same-slot scheduling (that is, slot offsets in the allocation table) based on the detection periodicity at which the terminal device detects the search space set, so that the terminal device can quickly adapt to a change in data traffic, reduce a latency of a data channel, and improve a power saving effect.

Figure 14:
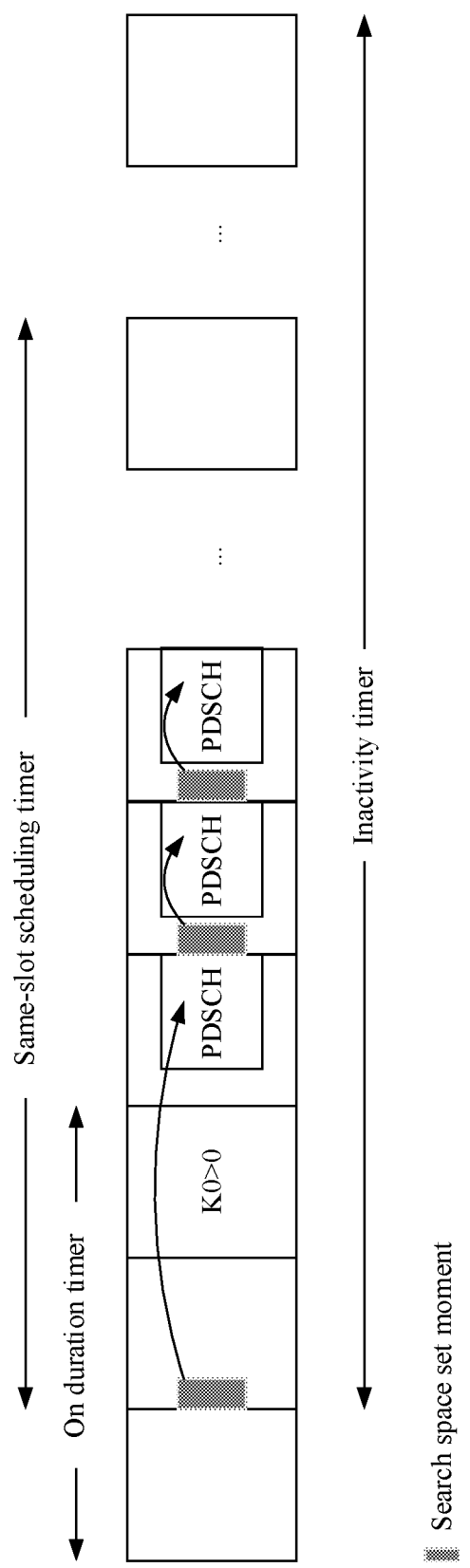
FIG. 14 is a schematic diagram of still another wireless communication method according to an embodiment of this application.

FIG. 14 shows a wireless communication method according to an embodiment of this application. Specifically, in the wireless communication method shown in FIG. 14, a scheduling manner to be used is determined based on a type of a timer used by a terminal device. For ease of understanding, a scenario to which this embodiment may be applied is first briefly described.

In a data transmission process, a packet-based data stream is usually bursty. Therefore, DRX may be configured for the terminal device. The terminal device may detect a PDCCH within "on duration" of a DRX cycle, and the terminal device starts an on duration timer at a time start location (that is, a time start location of "on duration") of each DRX cycle. The terminal device may detect the PDCCH within a time range of the on duration timer. If the terminal device detects no PDCCH within the time range of the on duration timer, the terminal device enters a sleep state when the on duration timer expires. That is, the terminal device may disable a receive circuit in the remaining time period of the DRX cycle, to reduce power consumption of the terminal. If the terminal device detects the PDCCH within the time range of the on duration timer, the terminal device starts an inactivity timer in the DRX mechanism. If the terminal device detects another PDCCH in runtime of the inactivity timer, the terminal device restarts the inactivity timer for counting again. If the inactivity timer is running, the terminal device still needs to continue to detect the PDCCH until the inactivity timer expires even if the originally configured on duration timer expires (that is, the on duration ends).

In this embodiment, when the terminal device enters the DRX active time and starts only the on duration timer, the network device schedules data for the terminal device based on a value set of slot offsets. When the terminal device starts the inactivity timer, the terminal device also starts a same-slot scheduling timer. During running of the same-slot scheduling timer, the network device schedules data based on a second value set of slot offsets. If the terminal device detects a PDCCH during running of the same-slot scheduling timer, the terminal device restarts the same-slot scheduling timer. When the same-slot scheduling timer expires, the network device reschedules data based on a first value set. If the terminal device detects a PDCCH again, the terminal device restarts the same-slot scheduling timer.

It should be understood that, when the terminal device detects no PDCCH within the time range of the on duration timer, the terminal device may use cross-slot scheduling for energy saving, to further reduce the power consumption, considering that no data may be scheduled within the entire running range of the on duration timer. In other words, if the terminal device uses only the on duration timer, the terminal device may use a cross-slot scheduling mechanism. If the terminal device uses the inactivity timer, that is, the terminal device receives a relatively large amount of network-transmitted data and there may be a requirement on a latency and a throughput, same-slot scheduling may be considered. Therefore, based on the types of the timers used by the terminal device, the terminal device or the network device may select a value set of slot offsets corresponding to the timer, where the value set corresponds to same-slot scheduling or cross-slot scheduling.

When the terminal device uses only the on duration timer, the network device may establish a correspondence between the on duration timer and the first value set, that is, a value set of slot offsets whose slot offsets are all greater than 0. The network device may configure the value set in a plurality of manners.

In an example, when the terminal device uses the on duration timer, the network device may independently configure a first allocation table by using higher layer signaling, and all slot offsets in the first allocation table are greater than 0. In other words, the slot offsets in the first value set are the slot offsets in the first allocation table. Because the first allocation table is configured for a case in which the terminal device uses the on duration timer, the first allocation table is associated with or has a correspondence with the on duration timer.

In another example, in a case in which the terminal device uses the on duration timer, a third allocation table is configured, where a corresponding slot offset is configured for each row in the third allocation table. Specifically, the third allocation table may include value sets of slot offsets corresponding to different types of timers used by the terminal device. For example, the third allocation table may include the first value set of slot offsets when the terminal device uses the on duration timer and the second value set of slot offsets when the terminal device uses the inactivity timer.

Optionally, when the terminal device uses the inactivity timer, the network device may need to schedule data on consecutive slots for the terminal device. Therefore, same-slot scheduling may be considered to be used to reduce a data scheduling latency. In other words, the inactivity timer used by the terminal device corresponds to the second value set, that is, at least one slot offset is 0.

In this embodiment, when the terminal device uses the same-slot scheduling timer, the network device may need to schedule data on consecutive slots for the terminal device.

Therefore, same-slot scheduling may be considered to be used to reduce a data scheduling latency. In other words, the same-slot scheduling timer used by the terminal device corresponds to the second value set, that is, at least one slot offset is 0. In addition, optionally, the network device configures duration of the same-slot scheduling timer for the terminal device.

In an example, when the terminal device uses the same-slot scheduling timer, the network device may independently configure a second allocation table by using higher layer signaling, and at least one slot offset in the second allocation table is equal to 0. In other words, the slot offsets in the second value set are the slot offsets in the second allocation table. Because the second allocation table is configured for a case in which the terminal device uses the same-slot scheduling timer, the second allocation table is associated with or has a correspondence with a timer whose type is the same-slot scheduling timer.

In another example, when the terminal device uses the same-slot scheduling timer, a third allocation table is configured, where a corresponding slot offset is configured for each row in the third allocation table. Specifically, the third allocation table may include value sets of slot offsets corresponding to different types of timers used by the terminal device. For example, the third allocation table may include the first value set of slot offsets when the terminal device uses the on duration timer and the second value set of slot offsets when the terminal device uses the same-slot scheduling timer.

The terminal device may select a value set from the first value set of slot offsets and the second value set of slot offsets based on the type of the timer used by the terminal device.

In an example, when the terminal device uses the on duration timer, the terminal device selects the first value set, and a corresponding scheduling manner is cross-slot scheduling. In this case, if the terminal device can learn, before the current slot in which the DCI is located, that there is no DCI-scheduled PDSCH in the current slot, the terminal device may disable a front-end module such as a downlink data radio frequency module and disable buffering of received downlink data within PDCCH decoding time, to enter a sleep state in advance to save power of the terminal device.

In another example, when the terminal device uses the same-slot scheduling timer, the terminal device selects the second value set, so that a data channel may be scheduled, by the network device, in a same-slot scheduling manner or in a cross-slot scheduling manner. However, a corresponding scheduling manner used when the terminal device selects the second value is not limited in this application.

Optionally, when the type of the timer used by the terminal device changes (for example, changes from the on duration timer to the same-slot scheduling timer), the terminal device may determine a corresponding allocation table or a slot offset in each row in the allocation table based on a corresponding timer. Then, a specific slot offset is determined based on an indication value of a time domain resource assignment information field in the DCI, to determine whether to use the cross-slot scheduling for power saving.

In this embodiment, a scheduling mechanism can be dynamically changed between cross-slot scheduling and same-slot scheduling (that is, slot offsets in the allocation table) based on the type of the timer used by the terminal device, so that the terminal device can quickly adapt to a change in data traffic, reduce a latency of a data channel, and improve a power saving effect.

Figure 15:
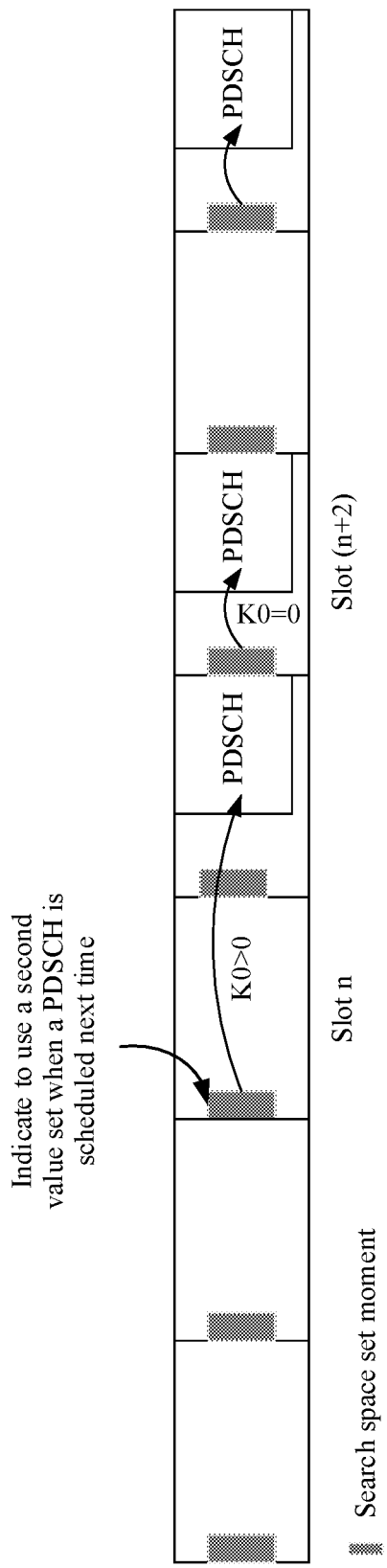
FIG. 15 is a schematic diagram of still another wireless communication method according to an embodiment of this application.

FIG. 15 shows still another wireless communication method according to an embodiment of this application. Specifically, in the wireless communication method shown in FIG. 15, a scheduling manner to be used is determined based on indication information carried in a previous piece of DCI received by a terminal device.

An information field in the DCI may indicate a value set (for example, a first value set or a second value set) or an allocation table (a first allocation table or a second allocation table) of slot offsets used for scheduling a PDSCH. A network device may use higher layer signaling to indicate one bit, for example, a most significant bit, in a time domain resource assignment information field of the DCI. In this case, remaining bits in the information field may indicate an index value of a row in the allocation table. The bit in the DCI is used to indicate a value set of slot offsets used by the PDCCH to schedule the PDSCH next time received by the terminal device.

When the terminal device detects the PDCCH, the terminal device determines a value set of slot offsets based on an indication value of the corresponding bit in the last detected DCI. As shown in FIG. 15, in a slot n, a corresponding information bit of the DCI detected by the terminal device indicates the second value set. In this case, when the terminal device detects the PDCCH in a slot (n+2), the terminal device assumes that the network device schedules the PDSCH for the terminal device based on the slot offsets in the second value set. In other words, a value set corresponding to the time domain resource assignment information field of the PDCCH detected in the slot (n+2) is the second value set.

It should be understood that the first value set and the second value set in this embodiment of this application may be slot offsets in allocation tables separately configured by the network device. For example, the slot offsets in the first value set are slot offsets in a first allocation table, and the slot offsets in the second value set are slot offsets in a second allocation table. Alternatively, both the slot offsets in the first value set and the slot offsets in the second value set are slot offsets in a third allocation table.

It should be further understood that when the terminal device determines to select the first value set, the scheduling manner of the PDSCH is cross-slot scheduling. When the terminal device determines to select the second value set, the scheduling manner of the PDSCH is same-slot scheduling or cross-slot scheduling. When the terminal device determines to select the first value set, the scheduling manner of the PDSCH is cross-slot scheduling. If the terminal device learns, before the current slot in which the DCI is located, that there is no DCI-scheduled PDSCH in the current slot, the terminal device may disable a front-end module such as a downlink data radio frequency module and disable buffering of received downlink data within PDCCH decoding time, to enter a sleep state in advance to reduce power consumption of the terminal device. When the scheduling manner of the PDSCH is same-slot scheduling, a latency of a data channel is reduced, a data throughput is increased, and power consumption is reduced.

Figure 16:
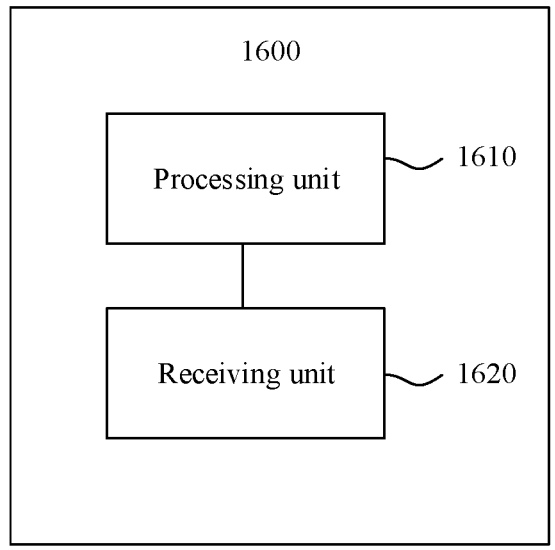
FIG. 16 is a schematic structural diagram of a terminal device according to an embodiment of this application.

FIG. 16 is a schematic structural diagram of a terminal device according to an embodiment of this application. The terminal device 1600 in FIG. 16 may be the terminal device mentioned above. The terminal device 1600 may be configured to implement the foregoing steps performed by the terminal device. The terminal device 1600 includes a processing unit 1610 and a receiving unit 1620.

The processing unit 1610 is configured to select, based on a first parameter, a value set from a first value set and a second value set that are of slot offsets and that are configured by a network device. All slot offsets in the first value set are greater than 0, at least one slot offset in the second value set is equal to 0, and the slot offset is used to indicate an offset in a quantity of slots of a downlink control information DCI-scheduled physical downlink shared channel (PDSCH) relative to the DCI.

The receiving unit 1620 is configured to receive DCI sent by the network device, where a slot offset carried in the DCI belongs to the value set determined by the terminal device.

Optionally, the processing unit 1610 is further configured to select the first value set when a quantity of receive antennas currently used by the terminal device is a first quantity of antennas.

Optionally, the processing unit 1610 is further configured to select the second value set when a quantity of receive antennas currently used by the terminal device is a second quantity of antennas. The first quantity of antennas is less than the second quantity of antennas.

Optionally, the processing unit 1610 is further configured to select the first value set when a periodicity at which the terminal device detects a search space set is a first detection periodicity.

Optionally, the processing unit 1610 is further configured to select the second value set when a periodicity at which the terminal device detects a search space set is a second detection periodicity. The first periodicity is greater than the second periodicity.

Optionally, the processing unit 1610 is further configured to select the first value set when the terminal device runs only an on duration timer.

Optionally, the processing unit 1610 is further configured to select the second value set when the terminal device runs a same-slot scheduling timer.

Figure 17:
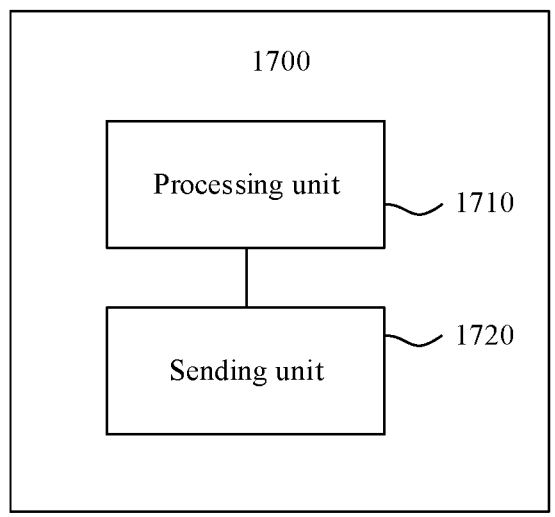
FIG. 17 is a schematic structural diagram of a network device according to an embodiment of this application.

FIG. 17 is a schematic structural diagram of a network device according to this application. The network device 1700 in FIG. 17 may be the network device mentioned above. The network device 1700 may be configured to implement the foregoing steps performed by the network device. The network device 1700 includes a processing unit 1710 and a sending unit 1720.

The processing unit 1710 is configured to configure a first value set and a second value set that are of slot offsets for a terminal device. All slot offsets in the first value set are greater than 0, at least one slot offset in the second value set is 0, and the slot offset is used to indicate an offset in a quantity of slots of a downlink control information DCI-scheduled physical downlink shared channel (PDSCH) relative to the DCI.

The processing unit 1710 is further configured to determine, based on a first parameter, to select a slot offset from the first value set or the second value set. The first parameter may include at least one of the following: a quantity of receive antennas currently used by the terminal device, a periodicity at which the terminal device detects a search space set, a type of a timer run by the terminal device, and first information carried in a previous piece of DCI received by the terminal device.

Optionally, the first information is used to indicate that a slot offset carried in a next piece of DCI to be sent by the network device belongs to the first value set or the second value set. The next piece of DCI herein is relative to the previous piece of DCI (that is, the DCI carrying the first information).

The sending unit 1720 is configured to send DCI that carries the slot offset to the terminal device.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed operating process of the foregoing systems, devices, and units, refer to corresponding processes in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions in the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or partially contribute to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes various media that can store program code, such as a USB flash drive, a removable hard disk, a read-only memory (ROM), a random access memory (RAM), a magnetic disk, and an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless communication method performed by a terminal device, the method comprising:
selecting, based on a first parameter, a value set from a first value set and a second value set that are of slot offsets and that are configured by a network device, wherein all slot offsets in the first value set are greater than a first threshold, and at least one slot offset in the second value set is equal to the first threshold; and
receiving downlink control information (DCI) sent by the network device, wherein a slot offset carried in the DCI belongs to the selected value set, and the slot offset is used to indicate an offset in a quantity of slots of a physical downlink shared channel (PDSCH) scheduled by the DCI relative to the DCI,
wherein the first parameter is a quantity of receive antennas currently used by the terminal device, and the selecting, based on a first parameter, a value set from a first value set and a second value set that are of slot offsets and that are configured by a network device comprises:
selecting the first value set when the quantity of receive antennas currently used by the terminal device is a first quantity of antennas; and
selecting the second value set when the quantity of receive antennas currently used by the terminal device is a second quantity of antennas, wherein the first quantity of antennas is less than the second quantity of antennas.

2. The method according to claim 1, wherein when the selected value set is the first value set, a scheduling manner of the PDSCH is cross-slot scheduling; and
when the selected value set is the second value set, a scheduling manner of the PDSCH is same-slot scheduling or cross-slot scheduling.

3. A wireless communication method performed by a terminal device, the method comprising:
selecting, based on a first parameter, a value set from a first value set and a second value set that are of slot offsets and that are configured by a network device, wherein all slot offsets in the first value set are greater than a first threshold, and at least one slot offset in the second value set is equal to the first threshold; and
receiving downlink control information (DCI) sent by the network device, wherein a slot offset carried in the DCI belongs to the selected value set, and the slot offset is used to indicate an offset in a quantity of slots of a physical downlink shared channel (PDSCH) scheduled by the DCI relative to the DCI, wherein:
a) the first parameter is a periodicity at which the terminal device detects the search space set, and the selecting, based on a first parameter, a value set from a first value set and a second value set that are of slot offsets and that are configured by a network device comprises:
selecting the first value set when the periodicity at which the terminal device detects the search space set is a first detection periodicity; and
selecting the second value set when the periodicity at which the terminal device detects the search space set is a second detection periodicity, wherein the first detection periodicity is greater than the second detection periodicity,
or
b) the first parameter is a type of the timer run by the terminal device, the terminal device is within a discontinuous reception (DRX) active time, and the selecting, based on a first parameter, a value set from a first value set and a second value set that are of slot offsets and that are configured by a network device comprises:
selecting the first value set when the terminal device runs only an on duration timer;
selecting the second value set when the terminal device runs a same-slot scheduling timer, wherein the same-slot scheduling timer is started or restarted when the terminal device detects a physical downlink control channel (PDCCH); and
selecting the first value set when the same-slot scheduling timer expires.

4. The method according to claim 3, wherein when the selected value set is the first value set, a scheduling manner of the PDSCH is cross-slot scheduling; and
when the selected value set is the second value set, a scheduling manner of the PDSCH is same-slot scheduling or cross-slot scheduling.

5. An apparatus, comprising:
at least one non-transitory storage medium including executable instructions; and
at least one processor; wherein the executable instructions, when executed by the at least one processor, cause the apparatus to implement:
selecting, based on a first parameter, a value set from a first value set and a second value set that are of slot offsets and that are configured by a network device, wherein all slot offsets in the first value set are greater than a first threshold, and at least one slot offset in the second value set is equal to the first threshold; and
receiving downlink control information (DCI) sent by the network device, wherein a slot offset carried in the DCI belongs to the selected value set, and the slot offset is used to indicate an offset in a quantity of slots of a physical downlink shared channel (PDSCH) scheduled by the DCI relative to the DCI,
wherein the first parameter is a quantity of receive antennas currently used by the terminal device, and the selecting, based on a first parameter, a value set from a first value set and a second value set comprises:
selecting the first value set when the quantity of receive antennas currently used by the terminal device is a first quantity of antennas; and
selecting the second value set when the quantity of receive antennas currently used by the terminal device is a second quantity of antennas, wherein the first quantity of antennas is less than the second quantity of antennas.

6. The apparatus according to claim 5, wherein when the selected value set is the first value set, a scheduling manner of the PDSCH is cross-slot scheduling; and
when the selected value set is the second value set, a scheduling manner of the PDSCH is same-slot scheduling or cross-slot scheduling.

* * * * *